United States Patent
Fisher et al.

(10) Patent No.: US 6,368,742 B2
(45) Date of Patent: *Apr. 9, 2002

(54) POLYPROPYLENE MICROPOROUS MEMBRANE FOR BATTERY SEPARATOR

(75) Inventors: Harold M. Fisher, Charlotte, NC (US); C. Glen Wensley, Rock Hill, SC (US)

(73) Assignee: Celgard, Inc., Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,516

(22) Filed: Jun. 26, 1998

(51) Int. Cl.[7] .......................... H01M 2/16; C08F 110/00
(52) U.S. Cl. ..................... 429/145; 429/144; 429/247; 429/249; 521/143; 521/918; 264/288.4; 264/290.2
(58) Field of Search ................. 429/144, 145, 429/247, 249; 521/143, 918; 264/288.4, 290.2

(56) References Cited

U.S. PATENT DOCUMENTS

| 5,134,174 A | 7/1992 | Xu et al. ................ 521/143 |
| 5,231,126 A | 7/1993 | Shi et al. ............... 524/296 |
| 5,317,035 A | 5/1994 | Jacoby et al. ............ 521/143 |
| 5,594,070 A | 1/1997 | Jacoby et al. ............ 525/88 |
| 5,667,911 A | 9/1997 | Yu et al. ................ 429/144 |
| 5,691,077 A | 11/1997 | Yu ....................... 429/62 |

FOREIGN PATENT DOCUMENTS

| EP | 0557 721 A2 | 9/1993 |
| EP | 0632 095 A2 | 1/1995 |
| JP | 7-118429 | 5/1995 |
| JP | 9-176352 | 7/1997 |

OTHER PUBLICATIONS

Polymers for Advanced Technologies, vol. 7, pp. 743–748, 1996 "A Novel Polypropylene Microporous Film".

Polymer vol. 36 No. 13 1995, p. 2525–2530, "Crystal Transformation and Micropore Formation During Uniaxial Drawing of B–form Polypropylene Film".

Polymer vol. 35 No. 16, 1994, p. 3442–3448, "Microvoid Formation Process During The Plastic Deformation of B–form Polyproylene".

Polypropylene '96 World Congress, Sep. 18–20, 1996, "NJ–Star NU–100: A Novel B–Nuleator for Polypropylene".

*Primary Examiner*—Samuel A. Acquah
(74) *Attorney, Agent, or Firm*—Robert H. Hammer, III

(57) ABSTRACT

A battery separator is a polypropylene microporous membrane, made from a beta-nucleated precursor, and having an electrical resistance of less than 30 ohms-inches per mil, and a puncture strength of greater than 400 grams-force per mil. mil.

12 Claims, No Drawings

POLYPROPYLENE MICROPOROUS MEMBRANE FOR BATTERY SEPARATOR

FIELD OF THE INVENTION

This invention is directed to a polypropylene microporous membrane, made from a beta-nucleated precursor, for use as a battery separator.

BACKGROUND OF THE INVENTION

Polypropylene microporous membranes, made from beta-nucleated precursors, are known. U.S. Pat. Nos. 5,134,174; 5,231,126; 5,317,035; & 5,594,070; EPO Publication No. 632,095; Japanese Kokai No. 7-118429; Chu, F. et al., "Microvoid formation process during the plastic deformation of Beta-form polypropylene", POLYMER v34 n16, 1994; Chu, F. et al., "Crystal transformation and micropore formation during uniaxial drawing of Beta-form polypropylene film", POLYMER v36 n13, 1995; Ikeda, N. et al., "NJ-Star NU-100: A Novel Beta-Nucleator for Polypropylene", Polypropylene & World Congress, Sep. 18–20, 1996; Zhu, W. et al., "A New Polypropylene Microporous Film", Polymers for Advanced Technologies, v7, 1996. Such membranes have been suggested for use as battery separators. U.S. Pat. No. 5,134,174; EPO Publication No. 632,095; Japanese Kokai No. 7-118429. Beta-nucleating agents for polypropylene are also known. U.S. Pat. Nos. 5,134,174; 5,231,126; 5,317,035; & 5,594,070; EPO Publication Nos. 557,721 & 632,095; Japanese Kokai Nos. 7-118429 & 9-176352; Chu, F. et al., "Microvoid formation process during the plastic deformation of Beta-form polypropylene", POLYMER v34 n16, 1994; Chu, F. et al., "Crystal transformation and micropore formation during uniaxial drawing of Beta-form polypropylene film", POLYMER v36 n13, 1995; Ikeda, N. et al., "NJ-Star NU-100: A Novel Beta-Nucleator for Polypropylene", Polypropylene & World Congress, Sep. 18–20, 1996; Zhu, W. et al., "A New Polypropylene Microporous Film", Polymers for Advanced Technologies, v7, 1996.

Commercially viable battery separators need to have a balance of properties. Two of these properties are electrical resistance (ER) and strength, typically measured as puncture strength (PS). Electrical resistance is a measure of the resistance to electrical flow between the anode and cathode and across the separator, and is generally preferred to be as low as possible. The micropores of the battery separator form channels through which electrolyte is in contact with the anode and cathode. Puncture strength is for withstanding the rigors of battery manufacture, among other things. Battery separators are usually extremely thin (approximately 1 mil or 25 micron), and are sandwiched between the anode and cathode which have sufficient surface roughness to cause puncture during the winding or folding of the sandwich. Puncture of the separator may lead to direct contact between the anode and cathode, which renders the battery unsuitable for use.

In U.S. Pat. No. 5,134,174, EPO Publication No. 632,095, and Japanese Kokai No. 7-118429, polypropylene microporous films, made from beta-nucleated precursors, for use as battery separator are disclosed. These films, while theoretically functional as separators, are limited. For example, the limitation of the films disclosed in the U.S. and the Japanese references arises from poor puncture strength. The puncture strength is apparent from the stretching (or drawing) conditions, as well as, the pore size and the porosity.

Accordingly, there is a need for a polypropylene microporous membrane, made from a beta-nucleated precursor, that is commercially viable as a battery separator.

SUMMARY OF THE INVENTION

A battery separator is a polypropylene microporous membrane, made from a beta-nucleated precursor, and having an electrical resistance of less than 30 ohms-inches per mil, and a puncture strength of greater than 400 grams-force per mil.

DESCRIPTION OF THE INVENTION

A battery, or an electrochemical cell, is a device generally comprising an anode, a cathode, an electrolyte, and a separator. Batteries may be used in portable devices, such as computers, cellular telephones, or the like, or in electric vehicles.

Battery separator, as used herein, refers to a microporous membrane that is used to separate the anode and the cathode, thereby preventing their direct contact, and to contain, in the micropores, the electrolyte. The separator may be a monolayer or a multilayer structure (i.e., a sandwich in which the individual layers may be the same or different) in which the disclosed film may be one of those layers. Other layers may enhance safety (i.e., low-melting or shutdown function, e.g., U.S. Pat. No. 5,691,077) or enhance strength (i.e., cross-plied, e.g., U.S. Pat. No. 5,667,911). The battery separator has a thickness less than 3 mils and preferable less than 1.5 mils.

The battery separator disclosed herein is a polypropylene microporous membrane made from a beta-nucleated precursor. Polypropylene refers to any polymer (e.g., homo -or co-polymer) of predominantly propylene monomers. Preferably, the polypropylene is an isotactic, homopolymer with a melt flow index (MFI) of less than (<) 10. More preferably, the MFI is less than 5. Exemplary polypropylenes include: Huntsman Chemical Corp. of Woodbury, N.J. product 5550 (MFI-5.5); Exxon Chemical Co. of Houston, Tex. product Escorene PP 4352 FI (MFI-about 3) & PP 4292 (MFI-1.5); Aristech Chemical Corp. of Pittsburgh, Pa. product BEPOL (MFI-0.7).

Beta-nucleated precursor refers to a pre-stretched polypropylene film having a beta-crystal structure. Beta-crystals are meta-stable and will revert to alpha-crystals when subjected to a combination of heat and stress. Beta-crystal may be formed in the polypropylene by any number of known techniques, but, the use of a beta-nucleating agent (or beta-nucleator) is preferred. See: U.S. Pat. Nos. 5,134,174; 5,231,126; 5,317,035; & 5,594,070; EPO Publication No. 632,095; Japanese Kokai Nos. 7-118429 & 9-176352; Chu, F. et al., "Microvoid formation process during the plastic deformation of Beta-form polypropylene", POLYMER v34 n16, 1994; Chu, F. et al., "Crystal transformation and micropore formation during uniaxial drawing of Beta-form polypropylene film", POLYMER v36 n13, 1995; Ikeda, N. et al., "NJ-Star NU-100: A Novel Beta-Nucleator for Polypropylene", Polypropylene & World Congress, Sep. 18–20, 1996; Zhu, W. et al., "A New Polypropylene Microporous Film", Polymers for Advanced Technologies, v7, 1996, each of which is incorporated herein by reference. Beta-nucleating agents are commercially available, for example NJ-STAR NU-100 is available from New Japan Chemical Co., Ltd., Osaka, Japan. The amount of beta-crystals in the precursor should be on the order of 45 to 70% as measured by a differential scanning calorimeter (DSC) technique (sample size-10 milligrams, heating rate-10°/min, heating range-25° C. to 200° C., using Seiko Instrument Inc.'s model 220 C). By this technique, the amount of beta-crystal is reported as the ratio of beta-crystal (measured as the area under the beta-crystal peak of the DSC trace) to the sum of beta- and alpha-crystal (the sum of the areas under the beta-crystal and the alpha-crystal peaks). The beta-crystal content of the precursor is not preferably maximized.

The porosity of the foregoing membranes should be in the range of 40–65%, preferably 45–60%, and more preferably 47–57%. Porosity (%) is: [1-(apparent density of membrane/resin density)]×100.

The average pore size should be on the order of 0.03 to 0.25 microns as measured from scanning electron microscope (SEM) photograph, magnification 20,000×. A preferred average pore size is in the range of 0.04–0.10 with the distribution skewed toward the low end of the range.

The electrical resistance of the separator should be less than 30 ohms-inches per mil of thickness. A more preferred range for electrical resistance is less than 20 ohm-inches per mil. The electrical resistance (or resistivity) is measured as follows: A R.A.I. AC Milliohm Resistance Meter, Model 2401 and R.A.I. test cell electrode (from RAI Research Corp. Hauppauge, N.Y.) are used. A 31% by wt KOH solution is used to wet the sample (samples should be methanol primed to ensure complete wetout then soaked in solution for 8 to 24 hours before testing). Samples should not be dry when tested. Three samples of material are tested and averaged. The results, reported in milliohm-inch$^2$, are then divided by the material thickness and reported as ohm-inches per mil.

A puncture strength of greater than 400 grams force per mil of thickness is preferred. There is no upper range on the puncture strength as in commercial operation, the greater the strength, the more preferred the separator is. The test procedure is as follows: A Mitech Stevens LFRA Texture Analyzer with a needle (1.65 mm in diameter, 0.5 mm radius tip) is used. The rate of descent is 2 mm/sec and the maximum amount of deflection is 6 mm. The film is held taut in a clamping device with a central opening of 11.3 mm in diameter. Ten measurements are taken, averaged and normalized to one mil of thickness.

The separator is preferably manufactured by the following 'dry-stretch' or OPP (oriented polypropylene) technique: the polypropylene resin is doped with the nucleator; the resin is extruded; a precursor is formed; and the precursor is stretched (drawn) into the battery separator. To obtain the balance of physical properties (e.g., porosity, average pore size, electrical resistance, and puncture strength), the precursor preferably has a beta-crystal content of 45–70%, more preferably 46–60%, and preferably undergoes a total stretch (TS) ranging from at least 16±7 to 36±7, preferably at least 16±4 to 36±7, and most preferably 16±4 to 20±4.

The beta-nucleator may be added to the resin during resin polymerization, by compounding, or at the extruder. Sufficient nucleator should be added to insure that the precursor's required content of beta-crystal is obtained prior to stretching.

After extrusion of the precursor, the beta-crystals must be given sufficient time to form within the precursor. The amount of time depends upon numerous factors including, but not limited to, amount and type of nucleator, type of polypropylene, residence time/temperature; and type of equipment. Beta-crystal growth begins at a higher temperature than the alpha-crystal growth. Ideally, one should maximize the time of the polymer at a temperature above the initiation temperature of alpha-crystal growth but below the initiation temperature of beta-crystal growth. Optionally, the precursor may be annealed before stretching.

Stretching may be uniaxial or biaxial, but biaxial is preferred. Biaxial stretching includes a machine direction (MD) stretch, a transverse direction (TD) stretch, and optionally a relax (or stress relief) step. The MD stretch conditions include: temperature preferably ranging from 70–110° C., most preferred at 90° C.; and stretch ratio preferably ranging from 1.5–6.0, preferably 4. The TD stretch conditions include: temperature preferably ranging from 110–140° C., most preferred at 120° C.; and stretch ratio ranging from 1.5–6.0, most preferred at 4–5. During stretching, it is assumed that the polymer is at or near the stated temperatures.

Further details of the process are set forth in the examples below.

EXAMPLE

The following examples were made on pilot equipment representing a conventional BOPP (biaxially oriented polypropylene) line that includes as major components: an extruder, an crystal formation section (i.e., a variable speed roll with temperature control), and a drawframe (i.e., temperature controlled with variable machine direction (MD) stretch, transverse direction (TD) stretch, and relax (or stress relief). Residence time in the crystal formation section (i.e., time on the roll) was about 30 seconds for all samples. The polypropylene resin was Exxon's Escorene PP 4352FI (MFI-about 3), the beta nucleator was NJ Star NU-100 and 0.2% by weight resin was used. Other conditions and properties are set forth in TABLE 1.

Although the foregoing invention has been described in some detail by way of illustration and example for purposes of clarity of understanding, it will be obvious that certain changes and modifications may be practiced within the scope of the appended claims.

TABLE 1

| Sample | Quench Roll Temp. ° C. | MD Temp. ° C. | MD Stretch Ratio | TD Temp. ° C. | TD Stretch Ratio | Total Stretch | Thickness mil | Ave Pore Size μm | Porosity % | PS/mil g/mil | ER/mil Ohm-in | PS/ER |
|---|---|---|---|---|---|---|---|---|---|---|---|---|
| 1 | 120 | 95 | 4.0 | 140 | 3.0 | 12.0 | 1.2 | 0.05 | 50.4 | 522 | 11.2 | 47 |
| 2 | 120 | 90 | 3.0 | 135 | 3.2 | 9.6 | 2.1 | — | 45.1 | 381 | 16.6 | 23 |
| 3 | 120 | 90 | 4.0 | 135 | 3.2 | 12.8 | 1.5 | 0.05 | 44.6 | 499 | 10.2 | 49 |
| 4 | 120 | 90 | 3.5 | 120 | 3.0 | 11.2 | 1.6 | — | 47.6 | 402 | 14.6 | 28 |
| 5 | 125 | 90 | 3.0 | 120 | 3.0 | 9.0 | 2.2 | — | 48.5 | 350 | 12.4 | 28 |
| 6 | 125 | 90 | 4.0(?) | 120 | 4.0 | 16.0 | 1.7 | 0.03 | 51.6 | 418 | 11.9 | 35 |
| 7 | 125 | 90 | 3.0(?) | 120 | 3.8–4.0 | 11.7 | 1.6 | 0.03 | 48.5 | 425 | 7.8 | 55 |
| 8 | 120 | 90 | 4.0 | 120 | 4.5 | 18.0 | 1.6 | 0.03 | 49.4 | 527 | 11.7 | 45 |

TABLE 1-continued

| Sample | Quench Roll Temp. °C. | MD Temp. °C. | MD Stretch Ratio | TD Temp. °C. | TD Stretch Ratio | Total Stretch | Thickness mil | Ave Pore Size µm | Porosity % | PS/mil g/mil | ER/mil Ohm-in | PS/ER |
|---|---|---|---|---|---|---|---|---|---|---|---|---|
| 9 | 120 | 90 | 4.0 | 120 | 3.8–4.0 | 15.2 | 1.1 | 0.03 | 47.8 | 569 | 12.7 | 45 |
| 10 | 120 | 90 | 4.0 | 120 | 3.8–4.0 | 15.2 | 1.3 | 0.04 | 46.5 | 490 | 12.5 | 39 |

We claim:

1. A process for making a battery separator having an electrical resistance of less than 30 ohms-inch per mil and a puncture strength of greater than 400 grams force per mil comprising the steps of:

providing a precursor having a beta crystal content of 46–60%; and biaxially stretching the precursor, a machine direction (MD) stretch being conducted at a temperature ranging between 70° and 110° C. and a MD stretch ratio ranging between 1.5 and 6.0, and a transverse direction (TD) stretch being conducted at a temperature ranging between 110° and 140° C. and a TD stretch ratio ranging between 1.5 and 6.0.

2. The process of claim 1 wherein said MD stretch being conducted at a temperature ranging between 90° and 95° C. and a MD stretch ratio ranging between 3.0 and 4.0.

3. The process of claim 1 wherein said MD stretch being conducted at a temperature of 90° C. and a MD stretch ratio of 4.0.

4. The process of claim 1 wherein said TD stretch being conducted at a temperature ranging between 120° and 140° C. and a TD stretch ratio ranging between 3.0 and 5.0.

5. The process of claim 1 wherein said TD stretch being conducted at a temperature of 120° C. and a TD stretch ratio ranging between 4.0 and 5.0.

6. The process of claim 1 wherein said MD stretch being conducted at a temperature ranging between 90° and 95° C. and a MD stretch ratio ranging between 3.0 and 4.0, and a TD stretch being conducted at a temperature ranging between 120° and 140° C. and a TD stretch ratio ranging between 3.0 and 5.0.

7. A process for making a microporous film having a thickness of less than 3 mils, an average pore size of 0.03 to 0.25 microns, a porosity ranging from above 40% to 65%, and a puncture strength of greater than 400 grams force per mil comprising the steps of:

providing a precursor having a beta crystal content of 46–60%; and biaxially stretching the precursor, a machine direction (MD) stretch being conducted at a temperature ranging between 70° and 110° C. and a MD stretch ratio ranging between 1.5 and 6.0, and a transverse direction (TD) stretch being conducted at a temperature ranging between 110° and 140° C. and a TD stretch ratio ranging between 1.5 and 6.0.

8. The process of claim 7 wherein said MD stretch being conducted at a temperature ranging between 90° and 95° C. and a MD stretch ratio ranging between 3.0 and 4.0.

9. The process of claim 7 wherein said MD stretch being conducted at a temperature of 90° and a MD stretch ratio of 4.0.

10. The process of claim 7 wherein said TD stretch being conducted at a temperature ranging between 120° and 140° C. and a TD stretch ratio between 3.0 and 5.0.

11. The process of claim 7 wherein said TD stretch being conducted at a temperature of 120° and a TD stretch ratio ranging between 4.0 and 5.0.

12. The process of claim 7 wherein said MD stretch being conducted at a temperature ranging between 90° and 95° C. and a MD stretch ratio ranging between 3.0 and 4.0, and a TD stretch being conducted at a temperature ranging between 120° and 140° C. and a TD stretch ratio ranging between 3.0 and 5.0.

* * * * *